US006837434B2

United States Patent
Shibuya et al.

(10) Patent No.: US 6,837,434 B2
(45) Date of Patent: Jan. 4, 2005

(54) LASER MODULE FOR BAR CODE READER

(75) Inventors: Kazuo Shibuya, Chiba (JP); Kenji Takase, Tokyo (JP); Tsuguaki Shibata, Miyagi (JP); Shigeru Shinzawa, Tokyo (JP); Tamiaki Matsuura, Kanagawa (JP); Hidekuni Aizawa, Kanagawa (JP); Keigo Suzuki, Fukushima (JP); Hideo Ohata, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/196,779

(22) Filed: Jul. 17, 2002

(65) Prior Publication Data

US 2003/0052174 A1 Mar. 20, 2003

(30) Foreign Application Priority Data

Jul. 19, 2001 (JP) ........................................ 2001-219303

(51) Int. Cl.[7] ................................................ G06K 7/10
(52) U.S. Cl. ................................... 235/462.43; 358/100
(58) Field of Search ........................... 235/462.43, 451; 359/642, 808, 811, 813, 819; 353/100, 101; 385/92, 93

(56) References Cited

U.S. PATENT DOCUMENTS 5,189,716 A * 2/1993 Matsubara et al. ........... 385/93
5,333,224 A * 7/1994 Kikuchi ....................... 385/93
5,673,350 A * 9/1997 Song et al. ................... 385/93

FOREIGN PATENT DOCUMENTS

JP          04097305 A  *  3/1992  ............ G02B/6/42
JP          11248973 A  *  9/1999  ............ G02B/6/42

* cited by examiner

Primary Examiner—Diane I. Lee
(74) Attorney, Agent, or Firm—Robert J. Depke; Holland & Knight LLP

(57) ABSTRACT

The present invention provides a laser module that can maintain weldability of a lens holder and improve machinability, and it protects a burr from being induced, and thereby improves optical accuracy, improves a reading accuracy of a bar code, improves mass productivity and reduces a manufacturing cost. In a laser module for a bar code reader, which has a packaged structure including a light emitting element and a light projection lens, for collecting a beam emitted from the light emitting element through the light projection lens and irradiating to an irradiation target, it includes: a cylindrical housing, in which the light emitting element is engaged with one end side; and a cylindrical lens holder, which is engaged with the other end side of the housing, for holding therein the light projection lens. Then, the lens holder is provided with: an inner cylinder, which is made of a metal having good machinability, for holding therein the light projection lens; and an outer cylinder engaged with a periphery of the inner cylinder and integrated with the inner cylinder, whose outer circumference is made of a metal having good weldability to be welded to the housing.

5 Claims, 6 Drawing Sheets

FIG. 6

| | W | Ta | Mo | Cr | Co | Ti | Be | Fe | Pt | Ni | Pd | Cu | Au | Ag | Mg | Al | Zn | Cd | Pd | Sn |
|---|---|---|---|---|---|---|---|---|---|---|---|---|---|---|---|---|---|---|---|---|
| W  |   |   |   |   |   |   |   |   |   |   |   |   |   |   |   |   |   |   |   |   |
| Ta | E |   |   |   |   |   |   |   |   |   |   |   |   |   |   |   |   |   |   |   |
| Mo | E | E |   |   |   |   |   |   |   |   |   |   |   |   |   |   |   |   |   |   |
| Cr | E | P | E |   |   |   |   |   |   |   |   |   |   |   |   |   |   |   |   |   |
| Co | F | F | E | F |   |   |   |   |   |   |   |   |   |   |   |   |   |   |   |   |
| Ti | F | E | E | E | F |   |   |   |   |   |   |   |   |   |   |   |   |   |   |   |
| Be | P | P | P | P | F | P |   |   |   |   |   |   |   |   |   |   |   |   |   |   |
| Fe | F | F | F | E | E | F | F |   |   |   |   |   |   |   |   |   |   |   |   |   |
| Pt | G | G | G | E | G | F | P | G |   |   |   |   |   |   |   |   |   |   |   |   |
| Ni | F | F | G | E | E | F | F | G | E |   |   |   |   |   |   |   |   |   |   |   |
| Pd | F | G | G | E | E | F | F | G | E | E |   |   |   |   |   |   |   |   |   |   |
| Cu | P | P | P | P | F | F | P | F | E | E | E |   |   |   |   |   |   |   |   |   |
| Au | - | - | P | F | P | F | F | F | F | P | F | F |   |   |   |   |   |   |   |   |
| Ag | P | P | P | P | P | P | P | P | P | P | F | F | F |   |   |   |   |   |   |   |
| Mg | P | - | P | P | F | P | P | F | P | F | F | G | F | G |   |   |   |   |   |   |
| Al | P | P | P | P | P | P | P | F | F | F | P | P | F | G | E |   |   |   |   |   |
| Zn | P | - | P | P | F | P | P | P | P | P | F | P | P | P | P | P |   |   |   |   |
| Cd | - | - | - | - | P | P | - | P | P | P | F | P | F | P | P | P | P |   |   |   |
| Pd | P | P | P | P | F | P | - | P | P | P | F | P | P | P | P | P | P | P |   |   |
| Sn | P | P | P | P | P | P | P | P | F | F | F | P | F | F | P | P | P | P | F |   |

LASER MODULE FOR BAR CODE READER

CROSS REFERENCES TO RELATED APPLICATIONS

The present document is based on Japanese Priority Document JP 2001-219303, filed in the Japanese Patent Office on Jul. 19, 2001, the entire contents of which being incorporated herein by reference.

BACKGROUND OF THE INVENTION

1. Field of the Invention

The present invention relates to a laser module for a bar code reader, which includes a light emitting element and a light projection lens and irradiates an emitted beam to a bar code being an irradiation target and, more particularly, to a technique for improving a lens holder for holding the light projection lens.

2. Description of Related Art

In recent years, many shops and factories and the like carry out sales management of goods and manufacture management of products and the like by putting a bar code indicative of digital information on an article and optically scanning it and thereby reading the information. Typically, lights are irradiated to the bar code of this kind, and a magnitude of reflection light is converted from an optical signal to an electric signal. Then, the information is read from a combination of detected signals.

As an apparatus for carrying out such optically reading operation as mentioned above, for example, there is a bar code reader having a mechanism shown in FIG. 7 in a main body. This bar code reader includes a light emitter/receiver 1 and a movable mirror 3 in a main portion of the configuration. The light emitter/receiver 1 is configured such that a laser module 5 and a light receiving module 7 are mounted on a substrate 9.

The laser module 5 further includes a light emitting element 11, a housing 13 and a lens holder 15. The lens holder 15 has a slit 17 at one end of a cylinder. Inside the lens holder 15, a retainer 21 fixedly holds a light projection lens 19. Also, the light receiving module 7 has a light receiving element 23, a housing 25, a light receiving lens 27 and a band pass filter (BPF) 29. The band pass filter 29 is operated so as to avoid receiving unnecessary lights other than the light at a light emitting frequency, in order to improve a reading accuracy.

A mirror 33 of the movable mirror 3 is oscillated in order to irradiate lights to the entire region of a bar code (not shown) that is an irradiation target. That is. a magnet (not shown) is fixed to the mirror 33 that is oscillatably supported with a pivot as a center. Then, the magnet is inserted into a driving coil (not shown), and a positive current and a negative current are alternatively applied to the driving coil, for example, at a constant cycle. Thus, the magnet is attracted into and repelled from the driving coil. Hence, the mirror 33 oscillates around the pivot as a support shaft.

In this bar code reader, the lights emitted from the light emitting element 11 are focused by the light projection lens 19. Then, those lights reflect off the mirror 33 of the movable mirror 3 and irradiate the entire region of the bar code.

On the other hand, although the lights irradiated to a surface of the bar code are diffusedly reflected, they are again returned back to the mirror 33 after the change in an optical amount resulting from white and black components of the bar code. Then, the light receiving lens 27 collects thus-reflected lights. In the light receiving element 23, the change in the optical amount is electrically converted and outputted. This output signal is processed by a computer (not shown). Hence, it is possible to decode the information of the bar code.

By the way, in the laser module, in order to improve an optical accuracy, it is necessary to position the light receiving element and the lens holder at high accuracies. For this reason, conventionally, the positioning is adjusted by preliminarily fixing the light emitting element to one end of the housing and moving the lens holder in a direction of a central axis at the other end of the housing. Then, at an optimal position, a laser welding is carried out to weld and to fix the lens holder and the housing. From the above-mentioned reasons, an Austenitic stainless steel SUS304, which is a metal having good weldability and having excellent corrosion and heat resistivity, and the like are used for the lens holder.

However, the SUS304 is poor in machinability although it is superior in weldability. On the other hand, on the lens holder, it is necessary to form the slit 17 shown in FIG. 9 for outputting the lights passed through the light projection lens and a retaining stage 15a of the light projection lens shown in FIG. 8 by a cutting operation. For this reason, the cutting operation is performed on the lens holder composed of the SUS304 having poor machinability. Thus, it is difficult to carry out a machining operation at high accuracy. Also, a burr 40 is easily induced. If the burr 40 is protruded into an optical path after the laser module is assembled or if this burr 40 is dropped, it has a bad influence on a beam property (especially if the burr exists in the slit portion) and causes the quality defect such as deterioration in reading accuracy or the like. Hence, in a case of the conventional laser module, after the cutting operation of the lens holder, a second operation, such as deburring and the like, and a burr removal checking operation using a microscope must be performed on all products. Moreover, the conventional laser module is low in productivity as well as poor in yield at the same time. Hence, this has a problem of an increase in a manufacturing cost.

SUMMARY OF THE INVENTION

The present invention is made in view of the above-mentioned circumstances. Therefore, the present invention provides a laser module that can maintain weldability of a lens holder and improve machinability and further prevents a burr from being induced so as to improve optical accuracy, to improve reading accuracy of a bar code, to improve productivity and to reduce a manufacturing cost.

A laser module for a bar code reader according to an aspect of the present invention is a laser module for a bar code reader, which has a packaged structure having a light emitting element and a light projection lens, for collecting a beam emitted from the light emitting element through the light projection lens and irradiating to an irradiation target. The laser module comprises a cylindrical housing, in which both ends are opened and the light emitting element is engaged inside of an opening on one end side; and a cylindrical lens holder, which is engaged inside of an opening on the other end side of the housing, for holding therein the light projection lens. In the laser module, the lens holder comprises an inner cylinder, which is made of a metal having good machinability, for holding therein the light projection lens; and an outer cylinder engaged with a periphery of the inner cylinder and integrated with the inner cylinder, whose outer circumference is made of a metal having good weldability to be welded to said housing.

According to this arrangement, it is possible to maintain the weldability of the lens holder and to improve the machinability. Consequently, cutting operation at the high accuracy and positioning between the light emitting element and the housing and between the housing and the light projection lens at high accuracies are made possible. Thus, optical accuracy of the laser module can be improved. Also, since the burr is not induced, it is possible to avoid quality defect caused by the burr invading into the optical path and deterioration in reading accuracy of the bar code caused by the bad influence of the burr on the beam property. Moreover, since the second process for removing the burr is not required, the productivity as well as the yield is improved at the same time. Hence, the manufacturing cost can be reduced.

In the laser module for a bar code reader, the metal having good machinability may be a brass, and the metal having good weldability may be a stainless steel.

According to the arrangement, since the inner cylinder is made of the brass, the good machinability is obtained and the burr is not induced. Thus, it is possible to perform the cutting operation of high accuracy on the engaged portion of the light emitting element, the light projection lens retaining portion and the beam emitter (for example, a slit). Also, since the outer cylinder is made of the stainless steel, the good weldability is maintained. Hence, the housing and the lens holder can be positioned at high accuracy by the welding operation. Moreover, since both of the brass and the stainless steel are superior in corrosive resistivity, it is possible to avoid deterioration in positioning accuracy caused by corrosion and the bad influence caused by rust.

The laser module for a bar code reader according to the first aspect of the present invention may include a protrusion formed by locally pressing a part of the outer cylinder from an outer side so that the protrusion protrudes within a range of a thickness of the inner cylinder.

In this laser module for the bar code reader, since the part of the outer cylinder is locally pressed to be a protrusion, it protrudes into the material of the inner cylinder. In short, it is at a situation that the protrusion protruding from the outer cylinder is embedded in the inner cylinder. Consequently, the inner cylinder and the outer cylinder, which are engaged with each other, are not relatively moved in a central axis direction and a circumferential direction even in view of structure. Thus, engaging strength between the inner cylinder and the outer cylinder is made stronger.

A laser module for a bar code reader according to another aspect of the present invention is a laser module for a bar code reader, which has a packaged structure having a light emitting element and a light projection lens, for collecting a beam emitted from the light emitting element through the light projection lens and irradiating to an irradiation target. The laser module comprises a cylindrical housing, in which both ends are opened and the light emitting element is engaged inside of an opening on one end side; and a cylindrical lens holder, which is engaged inside of an opening on the other end side of the housing, for holding therein the light projection lens. In the laser module, the lens holder comprises an inner cylinder, which is made of a metal having good machinability, for holding therein the light projection lens; and a metallic film, which covers a periphery of the inner cylinder, for propelling weldability to the housing.

According to this arrangement, the weldability of the lens holder can be maintained and the machinability thereof can be improved. Accordingly, cutting operation at high accuracy, and positioning at high accuracy between the light emitting element and the housing as well as between the housing and the light projection lens are made possible. Thus, the optical accuracy can be improved. Also, since the burr is not induced, it is possible to avoid quality defect caused by the burr invading into the optical path and reduction in reading accuracy of the bar code caused by the bad influence of the burr on the beam property. Moreover, since the second process for removing the burr is not required, mass productivity is increased, and the yield is improved at the same time. Hence, the manufacturing cost can be reduced.

The metallic film of the laser module for a bar code reader may be a nickel plating.

According to the arrangement, in the laser module, the housing and the inner cylinder are made of different kinds of the metals. Therefore, even if the metal used for the inner cylinder is the metal having the low beam absorption rate of the laser welding, when the nickel plating covers the periphery of this inner cylinder, the beam absorption rate of the inner cylinder can be increased (the beam absorption rate of the inner cylinder is made closer to the beam absorption rate of the housing) to thereby reduce the difference between the beam absorption rates of both the metals. Hence, the weldability can be improved even if the housing and the inner cylinder are made of the different kinds of the metals in which the beam absorption rates are different.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 6 is an explanation view illustrating superiority and inferiority of a weldability between different metals;

DESCRIPTION OF THE PREFERRED EMBODIMENTS

The preferable embodiment of a laser module for a bar code reader (hereafter, merely referred to as "laser module") according to the present invention will be described below in detail with reference to the drawings.

Figure 2:
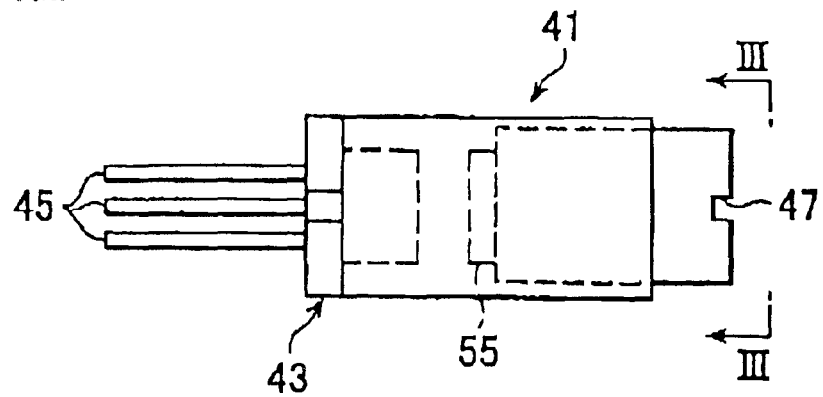
FIG. 2 is an outline view of a laser module.
Figure 3:
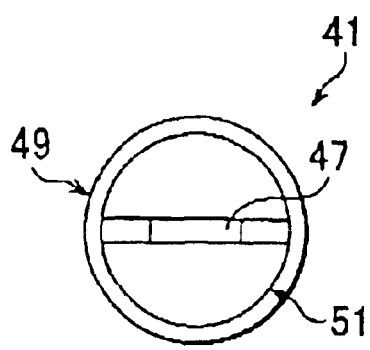
FIG. 3 is a view according to the arrow III of FIG. 2.
Figure 4:
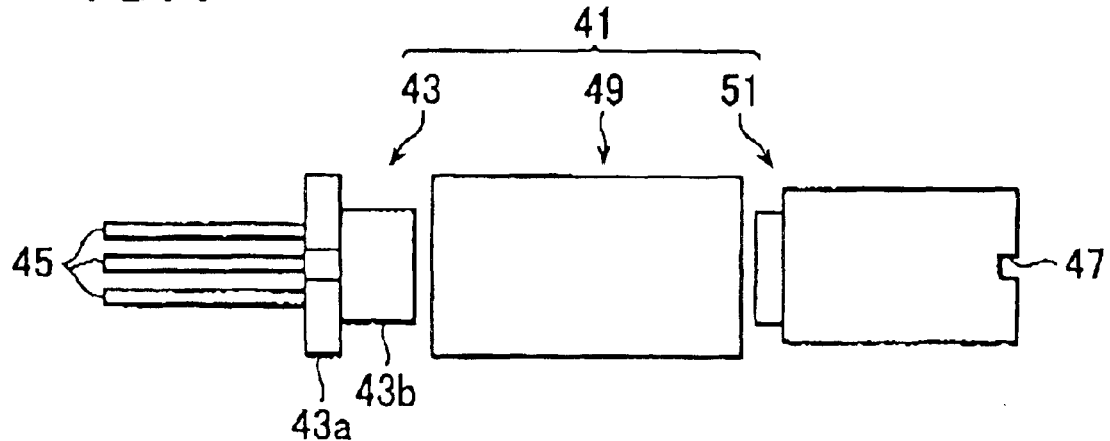
FIG. 4 is an exploded side view of the laser module.

As shown in FIGS. 2, 3, in a laser module 41 according to this embodiment, a body portion thereof is a cylindrical package. A plurality of leads 45 of a light emitting element 43 are drawn out from a rear end (a left end in FIG. 2) that is one end of the body portion, and a slit 47 for emitting a beam from the light emitting element 43 is provided at a tip (a right end in FIG. 2) that is the other end. In this laser module 41, as shown in FIG. 4, the body portion is configured by assembling the light emitting element 43, a housing 49 and a lens holder 51 on the same axis. Incidentally, this embodiment is described by taking an example in which the slit 47 that is a notched ditch in a diameter direction is provided on the tip surface of the cylindrical package as an opening for emitting the beam from the light emitting element 43. However, besides it, the opening for outputting the beam may be a rounded hole that is concentrically provided on a center of the tip surface of the package.

The light emitting element 43 comprises a base 43a having a shape of a circular plate of a large diameter and a base 43b having a shape of a circular plate of a small diameter that is placed coaxially and subsequently to the base 43a. The light emitting element 43 has a laser light emitter (not shown) at a tip surface of the base 43b. The plurality of leads 45 connected to respective electrodes within the element penetrate the base 43a, and protrude from the rear end surface thereof. In the light emitting element 43, an outer diameter of the base 43b is substantially coincident with an inner diameter of the housing 49. In the light emitting element 43, the base 43b is mounted from a rear end of the housing 49, and the base 43a is brought into contact with a rear end surface of the housing 49. Consequently, the emitter is positioned at a predetermined location on a central axis of the housing 49 and in a direction of the central axis. Incidentally, the light emitting element 43 and the housing 49 are fixed with adhesive if the light emitting element 43 is packaged with resin.

The housing 49 is cylindrical in shape, and both ends thereof are opened. Since the housing 49 is welded and joined with the lens holder 51, it is preferable that the housing 49 is made of a metal having good weldability. Also, since it is built in a bar code reader, the housing is desired to be excellent in corrosion resistivity, heat resistivity and impact resistivity, and it is also desired to have high strength in order to maintain optical accuracy. The material of the housing 49 must satisfy those conditions, and it needs to be selected by considering welding compatibility with the lens holder 51. Various combinations may be considered as described later. Among them, in this embodiment, a case in which a stainless steel (SUS304) that can be relatively easily obtained is used is explained as an example.

Figure 5:
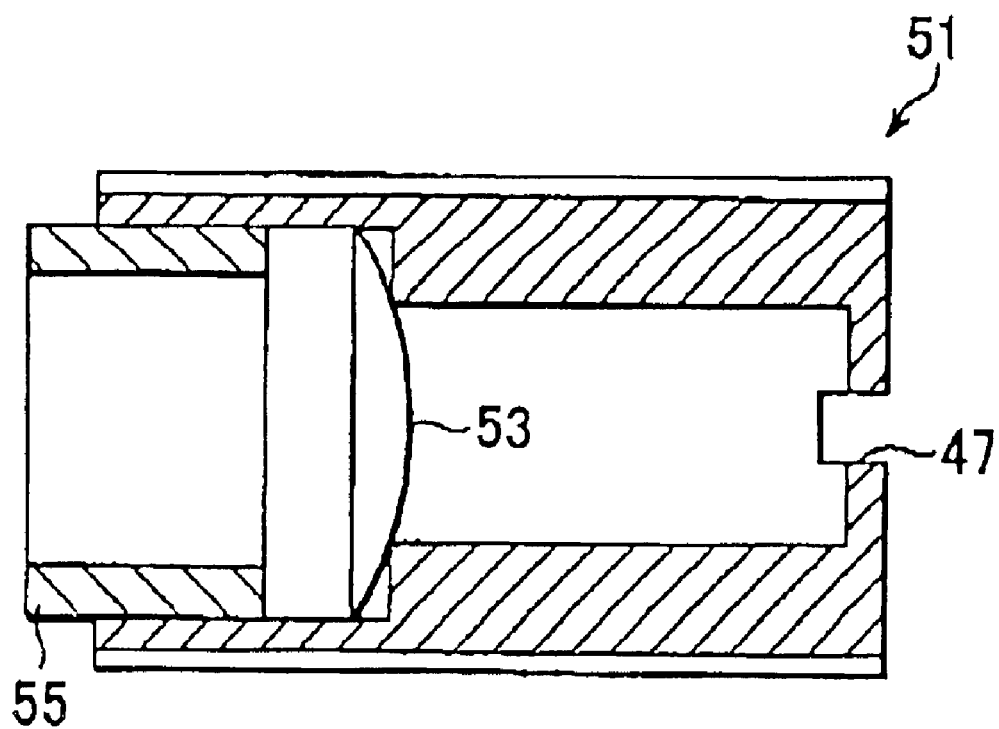
FIG. 5 is a sectional view of a lens holder.
Figure 7:
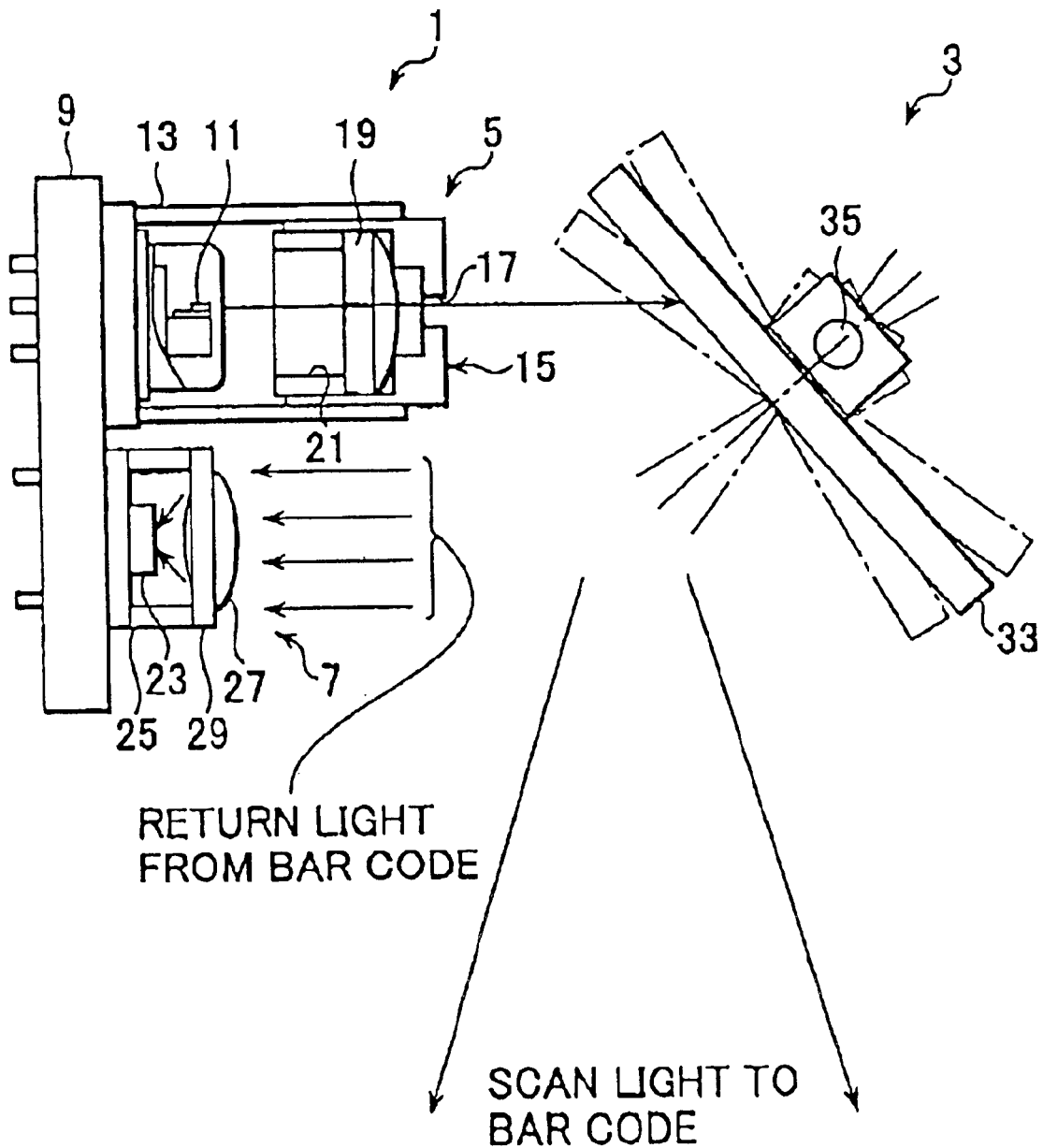
FIG. 7 is a sectional view of a main portion of a bar code reader having a conventional laser module.
Figure 8:
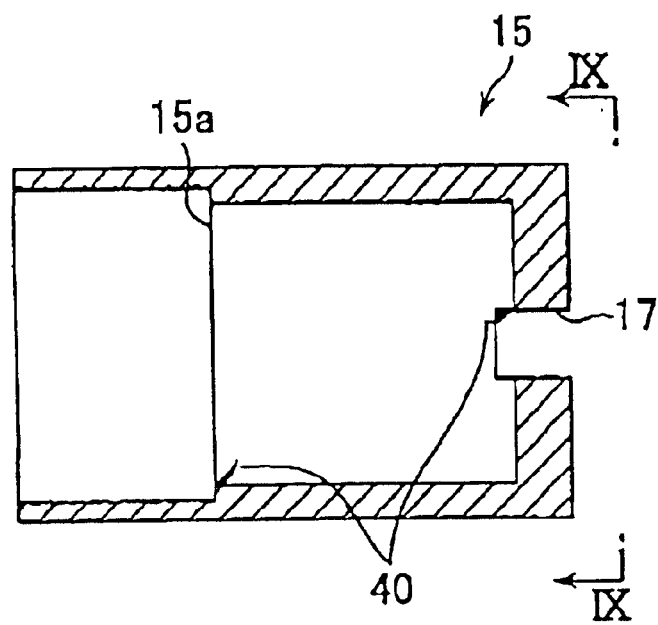
FIG. 8 is a sectional view of a lens holder used in a conventional laser module.
Figure 9:
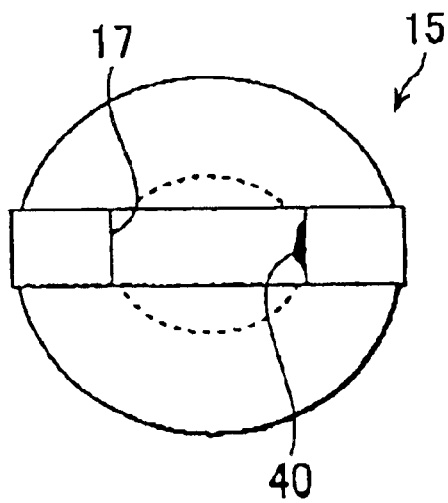
FIG. 9 is a view according to the arrow IX of FIG. 8.

The lens holder 51 is engaged with the tip of the housing 49 with which the light emitting element 43 is engaged at the rear end of the housing 49. As shown in FIG. 5, a light projection lens 53 is inserted into the lens holder 51, and a retainer 55 is inserted and engaged. Thus, the light projection lens 53 is positioned and fixed at a predetermined location on a central axis of the lens holder 51 and in a direction of the central axis thereof.

Figure 1:
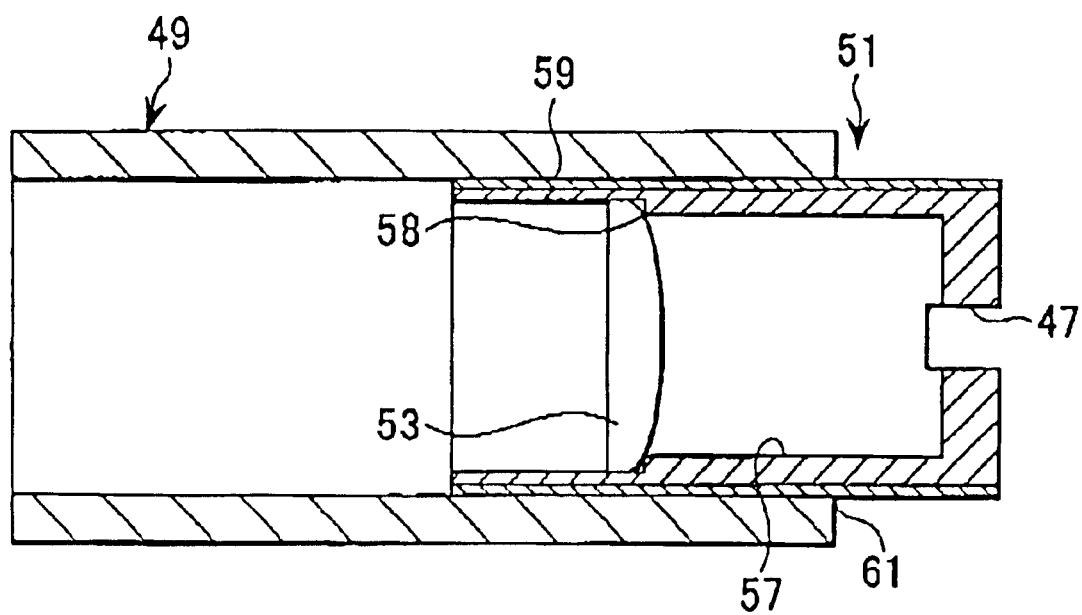
FIG. 1 is a sectional view of a main portion of a laser module according to the present invention.

As shown in FIG. 1, this lens holder 51 has an integrated dual-tube structure in which a cylindrical outer cylinder 59 is engaged with a periphery of a cylindrical inner cylinder 57. The inner cylinder 57 and the outer cylinder 59 are engaged with each other at the strength that they are not separated even by a thermally relative deformation when the light emitting element is driven or when it is welded to the housing 49 or a physically external force (impact and the like) when the bar code reader is used.

Also, the inner cylinder 57 and the outer cylinder 59 are made of metals different from each other. That is. the inner cylinder 57 is made of the metal having good machinability, and the outer cylinder 59 is made of the metal having good weldability. This is because inside the inner cylinder 57, it is necessary to cut a stage 58 for retaining the light projection lens and also cut a slit 47 at a tip of the inner cylinder 57, and because an outer circumference of the outer cylinder 59 needs to be welded to the housing 49.

In this embodiment, brass (C3604) is used as the metal having good machinability for the inner cylinder 57. The brass has high electrical and thermal conductivities and also has good corrosive resistivity and good plastic property (a spreading property and a machinability). In addition, in particular, C3560, C3561, C3710 and C3717 of free-cutting brass and the like can be suitably used as the brass having good machinability.

On the other hand, stainless steel (SUS304) is used for the outer cylinder 59 as the metal having good weldability. The stainless steel contains iron (Fe) as a main component and chrome (Cr) of about 12% or more, and it is made by mixing and adding nickel and other elements, as necessary. The stainless steel has the properties superior in beautiful appearance, strength, corrosive resistivity, heat resistivity, impact resistivity and the like to Fe.

The stainless steel can be roughly classified into a Martensitic stainless steel, a Ferrite stainless steel, an Austenitic stainless steel and a dual-phase stainless steel (Ferrite+ Austenite). The typical Martensitic stainless steel is SUS410 (<0.15% C, 11.5 to 13% Cr). Since a welded portion of the Martensitic stainless steel is hardened by Martensite transformation, a low temperature crack is liable to be induced. The Ferritic stainless steel can be roughly classified into a low Cr stainless steel to which Al is added (11 to 14% Cr), a middle Cr stainless steel (14 to 19% Cr) and a high Cr stainless steel (19% or more). In the Ferritic stainless steels belonging to this system, 475° C. (748 K) embrittlement or σ-phase embrittlement is liable to be induced in association with the increase in a Cr inclusion amount.

The typical example of the Austenitic stainless steel is the above-mentioned SUS304 (18% Cr, 8% Ni). In the portion influenced by heat when the SUS304 is welded, slight deterioration in the corrosive resistivity caused by the deposition of a grain boundary in a Cr carbide of an $M_{23}C_6$ type is feared in the region heated to 973 to 1173 K. For this reason, preferably, SUS304L (<0.03% C) in which the carbon inclusion amount of the SUS304 is reduced), and SUS321 (5×C % Ti) and SUS347 (10×C % Nb+Ta) in which Ti and Nb are respectively added to the SUS304and the carbons are settled as the respective carbides. In addition, SUS309S (22 to 24% Cr, 12 to 15% Ni, <0.08% C), SUS310S (24 to 26% Cr, 19 to 22% Ni, <0.08% C) and SUS316 (16 to 18% Cr, 10 to 14% Ni, 2 to 3% Mo, <0.08% C) and the like belong to the category of Austenitic stainless steel, and they can be suitably used as the outer cylinder 59. Moreover, it is possible to suitably use SUSXM15J1 (17 to 20% Cr, 11.5 to 15% Ni, 3 to 5% Si, <0.08% C) in which stress corrosion crack resistivity and oxidization resistivity are improved, SUS304N1 (18% Cr, 8% Ni, 0.02% N) in which pitting corrosion resistivity is improved, SUS317J$_1$ (16 to 19% Cr, 15 to 17% Ni, 4 to 6% Mo, <0.04% C) and the like.

In the outer cylinder 59, the outer circumference thereof is welded and fixed to a tip edge 61 of the housing 49 by means of a laser welding. When a laser beam of the laser welding hits a metallic surface, a part thereof is reflected, and a part thereof is absorbed. However, the mutual action between the absorbed laser beam and a metallic atom results in generation of heat, and it functions as a heat source. Since the laser beam is collected through a lens onto the metallic surface, it is possible to obtain a high energy density (10E3 to 10E13 w/cm$^2$). In this way, the laser welding uses the laser beam of the high energy density as the concentrated heat source. Thus, the material receives less thermal influence and deforms little when it is welded. That is, it is possible to quickly fix the housing 49 and the outer cylinder 59 at high accuracy.

Other metals may also be used for the housing 49 and the outer cylinder 59. As the example, it is possible to use the metals, for example, such as, tungsten (W), tantalum (Ta), molybdenum (Mo), chrome (Cr), cobalt (Co), titanium (Ti), beryllium (Be), iron (Fe), platinum (Pt), nickel (Ni), palladium (Pd), copper (Cu), gold (Au), silver (Ag), magnesium (Mg), aluminum (Al), zinc (Zn), cadmium (Cd), lead (Pb), tin (Sn) and the like, or the alloy in which they are used as the main material.

In this case, it is necessary that the kinds of the metals used for the housing 49 and the outer cylinder 59 are different from each other, in which weldability can be reserved at an excellent condition. FIG. 6 illustrates superiority and inferiority with regard to weldability between different kinds of the metals. In FIG. 6, "E" means excellent, "G" means good, "F" means fair, "P" means poor, and "-" means no data available. That is, from a viewpoint of the weldability, it is desired to select the different kinds of the metals, which show "E", "G" and "F", as the combination of the different metallic materials to be used for the housing 49 and the outer cylinder 59. It is further desired to select the different kinds of the metals which become "E" and "G". Incidentally, it is naturally possible to use the same kind of the metals for the metallic materials of the housing 49 and the outer cylinder 59. Typically, the weldability between the metals of the same kind is good.

In this way, in this embodiment, the lens holder 51 has the dual-tube structure in which the inner cylinder 57 and the outer cylinder 59 are made of the different kinds of the metals, that is, the brass and the stainless steel. As mentioned above, it is necessary that the inner cylinder 57 and the outer cylinder 59 are engaged with each other at strength that they are not separated even by a thermally relative deformation when they are welded and a physically external force (impact and the like). In this embodiment, the inner cylinder 57 and the outer cylinder 59 are integrally engaged with each other by a drawing operation. Incidentally, in this embodiment, a tube in which both ends are opened is used for a tube serving as a member of the outer cylinder 59, and a tube (in short, a cylindrical body) in which one end is closed is used for a tube serving as a member of the inner cylinder 57.

The drawing operation is carried out by drawing a dual tube, in which the outer cylinder 59 is inserted in advance into the outer circumference of the inner cylinder 57, through a die having a shape of a predetermined hole and then pulling the tube out. The dual tube is prepared in advance as a material to be machined. Then, it is used to cut the slit 47, the stage 58 and the like so that productivity thereof can be improved. Incidentally, the lens holder 51 in this embodiment requires the usage of the metal having the good weldability for the outer cylinder 59 and the usage of the metal having good machinability for the inner cylinder 57. Accordingly, the outer cylinder 59 and the inner cylinder 57 after the completion of the cutting operation may be engaged with each other.

Preferably, the lens holder 51 has a protrusion (not shown) formed by locally pressing a part of the outer cylinder 59 from an outer side, and this protrusion is protruded into the material of the inner cylinder 57, within a range of a thickness of the inner cylinder 57. This protrusion can be formed, for example, by a punching operation from the outer side of the outer cylinder 59 to a degree that the inner diameter of the inner cylinder 57 is not deformed.

The formation of the above-mentioned protrusion prevents the inner cylinder 57 and the outer cylinder 59, which are engaged with each other, from being relatively moved in the central axis direction and the circumferential direction, even in view of the structure. Thus, it is possible to further improve engaging strength between the inner cylinder 57 and the outer cylinder 59.

Hence, according to this laser module 41, the lens holder 51 comprises the inner cylinder 57 having good machinability and the outer cylinder 59 having good weldability, which is engaged with the periphery of this inner cylinder 57. Thus, it is possible to maintain the weldability of the lens holder 51 and to improve the machinability thereof. Consequently, cutting operation at high accuracy, and positioning at high accuracy between the light emitting element 43 and the housing 49 as well as between the housing 49 and the light projection lens 53 are made possible. Thus, the optical accuracy can be improved. Also, since the burr is not induced when the slit 47 and the stage 38 are cut and processed, it is possible to avoid quality defect caused by the burr invading into the optical path and reduction in reading accuracy of the bar code caused by the bad influence of the burr on the beam property. Moreover, since the second process for removing the burr is not required, the mass productivity of the laser module as well as the yield thereof is improved. Hence, the manufacturing cost can be reduced.

As a specific example, the good machinability of the inner cylinder 57 and the good weldability of the outer cylinder 59 can be attained by using the brass and the stainless steel. In this case, both of the brass and the stainless steel are superior in corrosive resistivity. Thus, it is possible to avoid deterioration in positioning accuracy caused by the corrosion and a bad influence on the optical accuracy caused by the rust.

By the way, in the above-mentioned embodiment, engaging the outer cylinder 59 made of the stainless steel with the outer circumference of the inner cylinder 57 ensures good weldability. However, the laser module according to the present invention may be designed such that a metallic film for propelling weldability covers the outer circumference of the inner cylinder 57. That is, since the metallic film is coated, the beam absorption ratio of the laser welding to the surface of the outer circumference of the lens holder can be increased to thereby improve the weldability.

Nickel plating, which has excellent corrosive and chemical resistivity and has many kinds of baths, and the like can be suitably used as the metallic film in this case. In particular, in the case of the nickel plating, non-brilliance, delustering, half-brilliance, black nickel and composite plating (dispersed plating) can be carried out depending on the kind of the bath. Thus, it is suitable for increasing the absorption rate of the laser welding beam. In this way, according to the laser module on which the metallic film is coated, the housing 49 and the inner cylinder 57 are made of the different kinds of the metals. Accordingly, even if the metal used for the inner cylinder 57 is the metal having the low beam absorption rate of the laser welding, when the nickel plating covers the outer circumference of this inner cylinder 57, the beam absorption rate of the inner cylinder 57 can be increased (the beam absorption rate of the inner cylinder 57 is made closer to the beam absorption rate of the housing 49) to thereby reduce the difference between the beam absorption rates of both the metals. Hence, the weldability can be improved even if the housing 49 and the inner cylinder 57 are made of the different kinds of the metals in which the beam absorption rates are different.

What is claimed is:

1. A laser module for a bar code reader, which has a packaged structure having a light emitting element and a light projection lens, comprising:

a cylindrical housing, wherein said light emitting element is secured such that light from the light emitting element is transmitted through the cylindrical housing;

a cylindrical lens holder, which is secured inside of an opening at an end of said cylindrical housing, for holding therein said light projection lens, wherein said lens holder comprises:

an inner cylinder, which is comprised of a first metal structure for holding therein said light projection lens; and an outer cylinder secured to a periphery of said inner cylinder, whose outer circumference is comprised of a second metal that is welded to the housing, wherein the second metal is materially different from the first metal.

2. A laser module for a bar code reader according to claim 1, wherein said inner cylinder metal is -brass, and said outer cylinder metal is -stainless steel.

3. A laser module for a bar code reader according to claim 1, further comprising a protrusion formed by locally pressing a part of said outer cylinder from an outer side so as to protrude within a range of a thickness of said inner cylinder.

4. A laser module for a bar code reader, comprising:

a housing, wherein said light emitting element is secured such that light from the light emitting element is transmitted through the cylindrical housing; and a cylindrical lens holder, which is secured inside of said housing, for holding therein said light projection lens, wherein said lens holder comprises:

an inner cylinder, which is comprised of a first metal structure for holding therein said light projection lens; and a metallic film, which covers a periphery of said inner cylinder that is welded to the housing, wherein the metallic film is not the same metal type as the first metal structure.

5. A laser module for a bar code reader, according to claim 4, wherein said metallic film is a nickel plating.

* * * * *